United States Patent [19]
Keelan

[11] 3,830,960

[45] Aug. 20, 1974

[54] CONTROL CIRCUIT FOR CONTROLLING AN APPARATUS

[75] Inventor: Joseph A. Keelan, Nabnasset, Mass.

[73] Assignee: GTE Sylvania Incorporated, Stamford, Conn.

[22] Filed: Mar. 30, 1973

[21] Appl. No.: 346,475

[52] U.S. Cl. .......... 178/5.4 R, 340/147 T

[51] Int. Cl. .......... H04n 9/02

[58] Field of Search . 178/DIG. 15, DIG. 1, 5.4 MC; 318/601, 602; 325/390, 391, 393; 340/147 T, 147 C, 147 CV, 147 CN, 147 B; 317/135, 137, 150, 157

[56] References Cited

UNITED STATES PATENTS

| | | | |
|---|---|---|---|
| 2,424,243 | 7/1947 | Lowell | 340/147 |
| 2,841,748 | 7/1958 | Reynolds | 340/147 |
| 2,864,008 | 12/1958 | Moore | 340/147 |
| 2,922,142 | 1/1960 | Lappin | 340/158 |
| 3,768,019 | 10/1973 | Podowski | 178/DIG. 15 |

*Primary Examiner*—Richard Murray
*Assistant Examiner*—R. John Godfrey
*Attorney, Agent, or Firm*—Peter Xiarhos; Elmer J. Nealon; Norman J. O'Malley

[57] ABSTRACT

A receiver control circuit for controlling the operation of a color television receiver, particularly in hospital installations. The receiver control circuit includes a remote control unit and a receiver unit connected to the remote control unit via a multi-wire cable. The remote control unit, when used in a hospital installation, is positioned at a bedside location and includes a plurality of manually-operated switches. These switches are assigned to different control modes of the receiver including turning the receiver "on" and "off" and changing channels, increasing the color level of the receiver, decreasing the color level of the receiver, increasing the tint level of the receiver, and decreasing the tint level of the receiver. The receiver unit, which is typically mounted in the cabinet of the receiver, includes a plurality of relay assemblies which are selectively operated in response to selective actuation of the switches in the remote control unit to variously operate motors and related mechanisms in the receiver for turning the receiver "on" and "off" or changing channels, for increasing or decreasing the color level of the receiver, and for increasing or decreasing the tint level of the receiver.

A significant advantage of the invention, particularly in hospital installations, is that the multi-wire cable interconnecting the remote control unit and the receiver unit may be implemented by an existing multi-wire cable as currently employed in a hospital with a black-and-white television receiver. Consequently, there is no need to replace an existing cable which could be costly and also disruptive of normal hospital operations. At the same time, several additional control functions can be achieved by the invention beyond the limited "on" and "off" and channel selection control functions associated with a black-and-white receiver.

12 Claims, 1 Drawing Figure

PATENTED AUG 20 1974 3,830,960
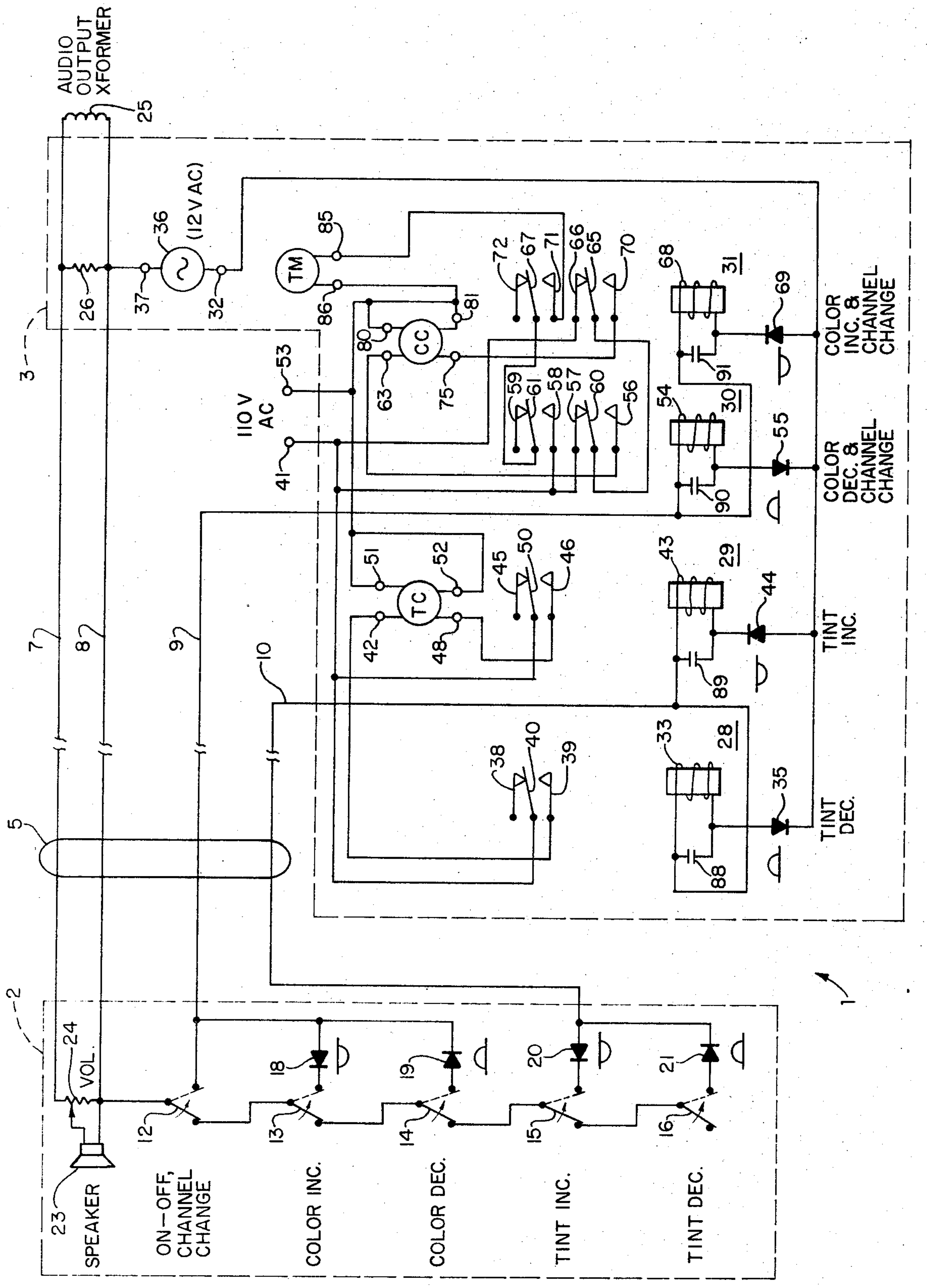

CONTROL CIRCUIT FOR CONTROLLING AN APPARATUS

BACKGROUND OF THE INVENTION

The present invention relates to a receiver control circuit and, more particularly, to a receiver control circuit for controlling the operation of a color television receiver.

There are many instances, for example, in hospitals, where it is desired to provide wall-mounted television receivers which can be controlled remotely by patients from bedside locations. At the present time, the majority of television receivers in use in hospitals by patients are of the black-and-white type. The operation of these black-and-white television receivers is generally controlled by means of manually-operated remote control units provided at bedside locations and connected to the wall-mounted receivers by means of cables. Most cables typically contain four wires or conductors which are variously used to turn the associated receivers on and off, to change channels, and to carry audio signals from the receivers to speakers provided within the corresponding remote control units. To connect a particular cable between a bedside remote control unit and an associated wall-mounted receiver usually requires that the cable be pulled through a conduit provided between the remote control unit and the receiver, "fished" above a false ceiling of the room in which the bedside remote control and the associated receiver are located, or buried in wall and/or ceiling structures of the room in which the remote control unit and receiver are located.

Due to the current popularity of color television receivers it has been proposed to replace many of the black-and-white television receivers presently installed in hospitals with color television receivers. In line with this proposal, it has been suggested to replace existing four-wire cables with cables each containing at least seven wires, these wires being variously used to turn an associated color television receiver on and off, to change channels, to increase color level, to decrease color level, to increase tint level, to decrease tint level, and to carry audio signals from the color receiver to a corresponding speaker at a bedside location. While this latter suggestion would appear to be reasonable and meritorious, the execution of the suggestion would require that existing four-wire cables be removed from conduit, removed from false ceilings, or removed from buried locations in wall and/or ceiling structures. Each of these removal operations, particularly the removal of buried cables, can be time consuming, disruptive of normal hospital operations, and/or costly, and is to be avoided wherever possible.

BRIEF SUMMARY OF THE INVENTION

Briefly, in accordance with the present invention, a control circuit is provided for controlling an apparatus such as a color television receiver. The control circuit of the invention generally includes first, second, and third conductors, a remote control unit coupled to first ends of the first, second, and third conductors, and an apparatus control means coupled to the opposite ends of the conductors. The remote control unit comprises first, second, third, fourth, and fifth circuit means each having a first operating state and a second operating state. The first, second, and third circuit means are each adapted to be operatively coupled to the first end of the first conductor and to the first end of the second conductor when in their second operating states, and the fourth and fifth circuit means are each adapted to be operatively coupled to the first end of the first conductor and to the first end of the third conductor when in their second operating states.

The apparatus control means of the invention comprises first, second, third, fourth, and fifth control means. The first control means is coupled between the opposite ends of the first and second conductors and is adapted to be coupled to a first control portion of an apparatus (such as a color television receiver) to be controlled. In accordance with the invention, the first control means is operative when the first circuit means of the remote control unit is in its second operating state to control the first control portion of the apparatus in a predetermined manner. The aforementioned second and third control means are each coupled between the opposite ends of the first and second conductors and adapted to be coupled to a second control portion of the apparatus. The second control means is operative when the second circuit means of the remote control unit is in its second operating state to control the second control portion of the apparatus in a first predetermined manner, and the third control means is operative when the third circuit means of the remote control unit is in its second operating state to control the second control portion of the apparatus in a second predetermined manner.

The aforementioned fourth and fifth control means are each coupled between the opposite ends of the first and third conductors and adapted to be coupled to a third control portion of the apparatus. In accordance with the invention, the fourth control means is operative when the fourth circuit means of the remote control unit is in its second operating state to control the third control portion of the apparatus in a first predetermined manner, and the fifth control means is operative when the fifth circuit means of the remote control unit is in its second operating state to control the third control portion of the apparatus in a second predetermined manner.

BRIEF DESCRIPTION OF THE DRAWING

The single FIGURE of the drawing illustrates a receiver control circuit in accordance with a preferred embodiment of the invention.

GENERAL DESCRIPTION OF THE INVENTION

Referring now to the single FIGURE of the drawing, there is shown a receiver control circuit 1 in accordance with a preferred embodiment of the invention. The receiver control circuit 1 generally comprises a remote control unit 2, and a receiver unit 3 connected to the remote control unit 2 via a cable 5 containing four wires or conductors 7, 8, 9 and 10. In the context of a hospital installation, the remote control unit 2 is located at the bedside of a patient, and the receiver unit 3 is located several feet away within the cabinet of the receiver, the receiver being generally mounted against a wall at a location several feet above floor level. The aforementioned four wires 7, 8, 9 and 10 of the cable 5 may represent the existing four wires of a cable as currently used with a black-and-white receiver in a hospital. Thus, there is no need to replace an existing four-wire cable with a new cable when converting from a black-and-white receiver installation to a color receiver installation.

The remote control unit 2, as employed in the present invention, includes a plurality of manually-operable switches 12–16, preferably of the spring-loaded type, by which the operation or functioning of the associated color receiver may be controlled. Each of the switches 12–16 is assigned to a different operation of the associated color receiver. Specifically, and as indicated in the figure, the switch 12 is used to turn the receiver "on" and 37 off" and to change channels; the switch 13 is used to increase the color level of the receiver; the switch 14 is used to decrease the color level of the receiver; the switch 15 is used to increase the tint level of the receiver; and the switch 16 is used to decrease the tint level of the receiver. When none of the abovementioned functions is to be performed, the switches 12–16 are in the positions shown in solid in the FIGURE, that is, in series, whereby no voltages or currents can be established on the wires 7–10 of the cable 5 for operating the receiver unit 3 or the components of the color receiver directly controlled by the receiver unit 3. The series arrangement of the switches 12–16 also serves to prevent more than one of the switches from being operated at one time and causing several control operations to take place smultaneously. The remote control unit 2 also includes four diodes 18, 19, 20 and 21 associated with the switches 13, 14, 15 and 16, respectively. The cathode of the diode 18 is arranged to be placed in series with the switch 13 when the switch 13 is operated to the position shown in dotted fashion in the FIGURE and the anode of the diode 18 is connected to the wire 9 of the cable 5. In a similar manner, the anode of the diode 19 is arranged to be placed in series with the switch 14 and the cathode is connected to the wire 9, the cathode of the diode 20 is arranged to be placed in series with the switch 15 and the anode is connected to the wire 10 of the cable 5, and the anode of the diode 21 is arranged to be placed in series with the switch 16 and the cathode is connected to the wire 10. The diodes 18 and 20 are therefore poled in a first direction and the diodes 19 and 21 are poled in a second, opposite direction, The purpose and operation of the diodes 18–21 will be described in detail hereinafter.

In addition to the foregoing elements, the remote control unit 2 further includes a speaker 23 and a variable resistance 24 connected in series with the switches 12–16 and in parallel with the speaker 23. The variable resistance 24 serves, in a well-known manner, to control the level or volume of audio supplied to the speaker 23 from an audio output transformer 25. The audio output transformer 25, which has a dummy load resistance 26 connected in parallel therewith, typically represents the existing audio output transformer of a conventional color television receiver.

The receiver unit 3, as employed in the present invention, includes four relay assemblies 28, 29, 30 and 31. Each of the relay assemblies 28–31, when operated, is used in executing a particular function as determined by the operator of the remote control unit 2. Specifically, and as indicated in the FIGURE, the relay assembly 28 is used in executing a decrease in the tint level of the receiver (switch 16 operated); the relay assembly 29 is used in executing an increase in the tint level of the receiver (switch 15 operated); the relay assembly 30 is used in executing a decrease in the color level of the receiver (switch 14 operated) and also in changing channels (switch 12 operated); and the relay assembly 31 is used in executing an increase in the color level of the receiver (switch 13 operated) and also in changing channels (switch 12 operated).

The relay assembly 28 (tint decrease) includes a winding 33 connected at the top end thereof to the wire 10 of the cable 5 and at the bottom end thereof to the anode of a diode 35. The cathode of the diode 35 is connected to a terminal 32 of a low voltage (e.g., 12v) ac source 36. Another terminal 37 of the ac source 36 is connected to the wire 8 of the cable 5 at the juncture of the audio output transformer 25 and the dummy load resistance 26. The relay assembly 28 also includes an upper fixed contact 38, a lower fixed contact 39, and an armature 40 movable between the fixed contacts 38 and 39. In the quiescent operating state of the relay assembly 28, that is, in the absence of a change in the tint level of the receiver, the position of the armature 40 is as shown in the FIGURE. The lower fixed contact 39 of the relay assembly 28 is connected to an input terminal 42 of a tint control motor TC and the armature 40 is coupled to a terminal 41 of a source of ac line voltage (110v) (not shown).

The relay assembly 29 (tint increase) is similar to the relay assembly 28 and includes a relay winding 43 connected at the top end thereof to the wire 10 of the cable 5 and at the bottom end thereof to the cathode of a diode 44. The anode of the diode 44, like the cathode of the diode 35, is connected to the terminal 32 of the aforementioned low-voltage ac source 36. The relay assembly 29 also includes an upper fixed contact 45, a lower fixed contact 46, and an armature 50. The lower fixed contact 46 is connected to a second input terminal 48 of the tint control motor TC, and the armature 50 is coupled to the terminal 41 of the source of ac line voltage. In the quiescent operating state of the relay assembly 29, that is, in the absence of a change in the tint level of the receiver, the position of the armature 50 is as shown in the figure. The tint control motor TC also includes a pair of additional input terminals 51 and 52 which are jointly connected to a second terminal 53 of the source of ac line voltage. Although not shown in the FIGURE, the tint control motor TC is coupled to the shaft of a tint control unit normally provided in the receiver for the purpose of changing (increasing or decreasing) the tint level of the receiver. The manner in which the tint control motor TC is used to achieve tint level changes will be described in detail hereinafter.

In a manner similar to the relay assemblies 28 and 29, the relay assembly 30 (color decrease and channel change) includes a relay winding 54 connected at the top end thereof to the wire 9 of the cable 5 and at the bottom end thereof to the anode of a diode 55. The cathode of the diode 55 is connected to the terminal 32 of the low voltage ac source 36. The relay assembly 30 also includes fixed contacts 56, 57, 58 and 59, and armature 60 movable between the fixed contacts 56 and 57, and an armature 61 movable between the fixed contacts 58 and 59. In the quiescent operating state of the relay assembly 30, that is, in the absence of a change in the color level of the receiver or a channel change, the positions of the armatures 60 and 61 are as shown in the FIGURE. The fixed contact 56 of the relay assembly 30 is connected to a first input terminal 63 of a color control motor CC, and the fixed contacts 57 and 58 are both coupled to the terminal 41 of the source of ac line voltage. The armature 60 of the relay assembly 30 is coupled to the terminal 41 of the source of ac line voltage via an armature 65 and a fixed contact 66 included in the relay assembly 31. The armature 61 of the relay assembly 30 is connected in series with an armature 67 of the relay assembly 31. In the quiescent operating state of the relay assembly 31, that is, in the absence of change in the color level of the receiver or a channel change, the positions of the latter mentioned armatures 65 and 67 of the relay assembly 31 are as shown in the FIGURE.

The relay assembly 31 (color increase and channel change), like the other relay assemblies includes a relay winding 68 connected at the top end thereof to the wire 9 of the cable 5 and at the bottom end thereof to the cathode of a diode 69. The anode of the diode 69 is connected to the terminal 32 of the low voltage ac source 36. The relay assembly 31 also includes, in addition to the aforementioned fixed contact 66 and the armatures 65 and 67, fixed contacts 70, 71 and 72. The fixed contact 70 is connected to a second input terminal 75 of the color control motor CC. The color control motor CC also has a pair of additional input terminals 80 and 81 which are jointly connected to the terminal 53 of the source of ac line voltage. In a manner similar to the tint control motor TC, the color control motor CC is coupled to the shaft of a color control unit normally provided in the receiver for the purpose of changing (increasing or decreasing) the color level of the receiver. The manner in which the color control motor TC is used to achieve color level changes will be described in detail hereinafter.

The receiver unit 3 of the invention also includes a tuner motor TM for use in turning the receiver "on" and "off" and in making channel changes. The tuner motor TM has a first input terminal 85 connected to the fixed contact 71 of the relay assembly 31 and a second input terminal 86 connected to the terminal 53 of the source of ac line voltage. The tuner motor TM is typically coupled to a mechanism (not shown) for turning the receiver "on" and "off" and for changing channels of the receiver. The operation of the tuner motor TM will be described in detail hereinafter.

The receiver unit 3 further includes a plurality of capacitors 88, 89, 90 and 91 connected in parallel with the windings 33, 43, 54 and 68 of the relay assemblies 28, 29, 30 and 31, respectively. These capacitors serve to suppress contact chatter during the operation of the relay assemblies 28–31 and, as will be later described, also to maintain current flow established through the relay windings of the relay assemblies 28–31.

OPERATION

The operation of the receiver control circuit 1 will now be described in detail. It will be assumed that the following specific operations are to be performed:

a. turning receiver "on" and "off" and changing channels;
b. increasing the color level of the receiver;
c. decreasing the color level of the receiver;
d. increasing the tint level of the receiver; and
e. decreasing the tint level of the receiver.

a. Turning receiver "on" and "off" and changing channels

To turn the receiver associated with the receiver control circuit 1 from its "off" state to its "on" state, the switch 12 is operated to the position shown in dotted fashion in the FIGURE. With switch 12 in the latter position, the ac voltage produced by the low voltage ac source 36 is coupled via the operated switch 12 to the relay windings 54 and 68 of the relay assemblies 30 and 31, respectively, whereby current flow is established through both of these windings. With respect to the relay assembly 30, a current path is established for the relay winding 54 thereof which extends from the terminal 37 of the low voltage ac source 36, the wire 8 of the cable 5, the operated switch 12, the wire 9 of the cable 5, the relay winding 54, and the diode 55, to the terminal 32 of the low voltage ac source 36. Current flow is also established through the capacitor 90 for charging the capacitor 90, specifically, during the positive half cycles of the ac voltage produced by the low voltage ac source 36 (noting the poling of the diode 55). The capacitor 90 discharges during the negative half cycles of the ac voltage produced by the low voltage dc source 36 whereby the current flow through the relay winding 54 is maintained during the negative half cycles. In a similar manner as described above, a current path is established for the relay winding 68 of the relay assembly 31 which extends from the terminal 37 of the low voltage ac source 36, the wire 8, the operated switch 12, the wire 9, the relay winding 68, and the diode 69, to the terminal 32 of the low voltage ac source 36. Current flow is also established through the capacitor 91 for charging the capacitor 91, specifically, during the negative half cycles of the ac voltage produced by the low voltage ac source 36 (noting the poling of the diode 69). In a manner similar to the capacitor 90, the capacitor 91 discharges during the positive half cycles of the ac voltage produced by the low voltage ac source 36 whereby the current flow through the relay winding 68 is maintained during the positive half cycles.

With current flow established simultaneously in both of the relay windings 54 and 68 of the relay assemblies 30 and 31, the armature 61 of the relay assembly 30 is caused to move against the fixed contact 58 and the armature 67 of the relay assembly 31 is caused to move against the fixed contact 71. With the armatures 61 and 67 in these latter positions, the ac line voltage (110v) produced by the source of ac line voltage is caused to be applied across the input terminals 85 and 86 of the tuner motor TM to cause operation of the tuner motor TM. The current path for the tuner motor TM at this time extends from the terminal 41 of the source of ac line voltage, the fixed contact 58 and the armature 61 of the relay assembly 30, the armature 67 and the fixed contact 71 of the relay assembly 31, the terminals 85 and 86 of the tuner motor TM, to the terminal 53 of the source of ac line voltage. The tuner motor TM operates in response to the ac line voltage applied across its input terminals 85 and 86 to select the first channel of the receiver following the "off" position. To select additional successive channels, the switch 12 is simply maintained depressed (or operated an additional number of times) whereby the tuner motor TM is caused to select successive channels. After the last channel has been selected, the continued operation of the switch 12 causes the tuner motor TM to operate the receiver back to its "off" state.

b. Increasing the color level of the receiver

To increase the color level of the receiver, the switch 13 is operated to the position shown in dotted fashion in the FIGURE (while the other switches 12, 14, 15 and 16 remain in their unoperated positions shown in solid in the FIGURE). With the switch 13 in its operated position, the ac voltage produced by the low voltage ac source 36 is coupled to the relay winding 68 of the relay assembly 31 whereby current flow is caused to be established in the relay winding 68. Specifically, a current path is established for the relay winding 68 which extends from the terminal 37 of the low voltage ac source 36, the wire 8, the switch 12 (unoperated), the operated switch 13, the diode 18, the wire 9, the relay winding 68, and the diode 69, to the terminal 32 of the low voltage ac source 36. As in the previous example, current flow is also established through the capacitor 91 for charging the capacitor 91 during negative half cycles of the ac voltage produced by the low voltage ac source 36 (noting the poling of the diodes 18 and 69). The capacitor 91 discharges during the positive half cycles of the ac voltage produced by the low voltage ac source 36 thereby maintaining current flow in the relay winding 68 during the positive half cycles. The poling of the diode 18 also serves to prevent the establishing of current flow through the relay winding 54 of the relay assembly 30 whenever the switch 13 is in its operated position. Thus, the armatures 60 and 61 of the relay assembly 30 remain in the positions shown in the FIGURE.

With current flow established in the relay winding 68 of the relay assembly 31, the armature 65 is caused to move against the fixed contact 70. The ac line voltage produced by the source of ac line voltage is then caused to be applied across the input terminals 75 and 81 of the color control motor CC. The current path for the color control motor CC at this time extends from the terminal 41 of the source of ac line voltage, the fixed contact 57 and the armature 60 of the relay assembly 30 (unoperated), the armature 65 and the fixed contact 70 of the relay assembly 31, the terminals 75 and 81 of the color control motor CC, to the terminal 53 of the source of ac line voltage. The color control motor CC operates in response to the ac line voltage applied across its terminals 75 and 81 to rotate the shaft of the color control unit (not shown) of the receiver in a direction to increase the color level of the receiver. To achieve additional increases in the color level of the receiver, the switch 13 is simply maintained depressed (or operated an additional number of times) whereby the color control motor CC is operated to cause additional increase in the color level of the receiver.

c. Decreasing the color level of the receiver

To decrease the color level of the receiver, the switch 14 is operated to the position shown in dotted fashion in the FIGURE (while the other switches 12, 13, 15 and 16 remain in their unoperated positions shown in solid in the FIGURE). With the switch 14 in its operated position, the ac voltage produced by the low voltage ac source 36 is coupled to the relay winding 54 of the relay assembly 30 whereby current flow is caused to be established in the relay winding 54. The current path established for the relay winding 54 extends from the terminal 37 of the low voltage ac source 36, the wire 8, the switches 12 and 13 (unoperated), the operated switch 14, the diode 19, the wire 9, the relay winding 54, and the diode 55, to the terminal 32 of the low voltage ac source 36. Current is also established through the capacitor 90 for charging the capacitor 90 during positive half cycles of the ac voltage produced by the low voltage ac source 36 (noting the poling of the diodes 19 and 55). The capacitor 90 discharges during the negative half cycles of the ac voltage produced by the low voltage ac source 36 thereby maintaining current flow through the relay winding 54 during the negative half cycles. The poling of the diode 19 also serves to prevent the establishing of current flow through the relay winding 68 of the relay assembly 31 wherever the switch 14 is in its operated position. Thus, the armatures 65 and 67 of the relay assembly 31 remain in the positions shown in the FIGURE.

With current flow established in the relay winding 54 of the relay assembly 30, the armature 60 is caused to move against the fixed contact 56. The ac line voltage produced by the source of ac line voltage is then caused to be applied across the input terminals 63 and 80 of the color control motor CC. The current path for the color control motor CC at this time extends from the terminal 41 of the source of ac line voltage, the fixed contact 66 and the armature 65 of the relay assembly 31 (unoperated), the armature 60 and the fixed contact 56 of the relay assembly 30, the terminals 63 and 80 of the color control motor CC, to the terminal 53 of the source of ac line voltage. The color control motor CC operates in response to the ac line voltage applied across its terminals 63 and 80 to rotate the shaft of the color control unit (not shown) of the receiver in a direction to decrease the color level of the receiver. To achieve additional decreases in the color level of the receiver, the switch 14 is simply maintained depressed (or operated an additional number of times) whereby the color control motor CC is operated to cause additional decreases in the color level of the receiver.

d. Increasing the tint level of the receiver

To increase the tint level of the receiver, the switch 15 is operated to the position shown in dotted fashion in the FIGURE (while the other switches 12, 13, 14 and 16 remain in their unoperated positions shown in solid in the FIGURE). With the switch 15 in its operated position, the ac voltage produced by the low voltage ac source 36 is coupled to the relay winding 43 of the relay assembly 29 whereby current flow is caused to be established in the relay winding 43. The current path established for the relay winding 43 extends from the terminal 37 of the low voltage ac source 36, the wire 8, the switches 12, 13 and 14 (unoperated), the operated switch 15, the diode 20, the wire 10, the relay winding 43, and the diode 44, to the terminal 32 of the low voltage ac source 36. Current is also established through the capacitor 89 for charging the capacitor 89 during negative half cycles of the ac voltage produced by the low voltage ac source 36 (noting the poling of the diodes 20 and 44). The capacitor 89 discharges during the positive half cycles of the ac voltage produced by the low voltage ac source 36 thereby maintaining current flow through the relay winding 43 during the positive half cycles. The poling of the diode 20 also serves to prevent the establishing of current flow through the relay winding 33 of the relay assembly 28 whenever the switch 15 is in its operated position. Thus, the armature 40 of the relay assembly 28 remains in the position shown in the FIGURE.

With current flow established in the relay winding 43 of the relay assembly 29, the armature 50 is caused to move against the fixed contact 46. The ac line voltage produced by the line voltage source is then caused to be applied across the input terminals 48 and 52 of the tint control motor TC. The current path for the tint control motor TC at this time extends from the terminal 41 of the source of ac line voltage, the armature 50 and the fixed contact 46 of the relay assembly 29, the terminals 48 and 52 of the tint control motor TC, to the terminal 53 of the source of ac line voltage. The tint control motor TC operates in response to the ac line voltage applied across its terminals 48 and 52 to rotate the shaft of the tint control unit (not shown) of the receiver in a direction to increase the color level of the receiver. To achieve additional increases in the tint level of the receiver, the switch 15 is simply maintained depressed (or operated an additional number of times) whereby the tint control motor TC is operated to cause additional increases in the tint level of the receiver.

e. Decreasing the tint level of the receiver

To decrease the tint level of the receiver, the switch 16 is operated to the position shown in dotted fashion in the FIGURE (while the other switches 12, 13, 14 and 15 remain in their unoperated positions shown in solid in the FIGURE). With the switch 16 in its operated position, the ac voltage produced by the low voltage ac source 36 is coupled to the relay winding 33 of the relay assembly 28 whereby current flow is caused to be established in the relay winding 33. The current path established for the relay winding 33 extends from the terminal 37 of the low voltage ac source 36, the wire 8, the switches 12, 13, 14 and 15 (unoperated), the operated switch 16, the diode 21, the wire 10, the relay winding 33, and the diode 35 to the terminal 32 of the low voltage ac source 36. Current is also established through the capacitor 88 for charging the capacitor 88 during positive half cycles of the ac voltage produced by the low voltage ac source 36 (noting the poling of the diodes 21 and 35). The capacitor 88 discharges during the negative half cycles of the ac voltage produced by the low voltage ac source 36 thereby maintaining current flow through the relay winding 33 during the negative half cycles. The poling of the diode 21 also serves to prevent the establishing of current flow through the relay winding 43 of the relay assembly 29 whenever the switch 16 is in its operated position. Thus, the armature 50 of the relay assembly 29 remains in the position shown in the FIGURE.

With current flow established in the relay winding 33 of the relay assembly 28, the armature 40 is caused to move against the fixed contact 39. The ac line voltage produced by the line voltage source is then caused to be applied across the input terminals 42 and 51 of the tint control motor TC. The current path for the tint control motor TC at this time extends from the terminal 41 of the source of ac line voltage, the armature 40 and the fixed contact 39 of the relay assembly 29, the terminals 42 and 51 of the tint color control motor TC, to the terminal 53 of the source of ac line voltage. The tint control motor TC operates in response to the ac line voltage applied across its terminals 42 and 51 to rotate the shaft of the tint control unit (not shown) of the receiver in a direction to decrease the color level of the receiver. To achieve additional decreases in the tint level of the receiver, the switch 16 is simply maintained depressed (or operated an additional number of times) whereby the tint control motor TC is operated to cause additional decreases in the tint level of the receiver.

While there has been shown and described what is considered a preferred embodiment of the invention, it will be obvious to those skilled in the art that various changes and modifications may be made therein without departing from the invention as called for in the appended claims.

What is claimed is:

1. A control circuit for controlling an apparatus, comprising:

first, second, and third conductors;

a remote control unit coupled to first ends of the first, second, and third conductors and comprising:

first, second, third, fourth and fifth circuit means each having a first operating state and a second operating state;

said first, second, and third circuit means each being adapted to be operatively coupled to the first end of the first conductor and to the first end of the second conductor when in their second operating states; and said fourth and fifth circuit means each being adapted operatively coupled to the said first end of the first conductor and to the first end of the third conductor when in their second operating states; and apparatus control means coupled to the opposite ends of the first, second and third conductors and comprising:

first control means coupled between the opposite ends of the first and second conductors and adapted to be coupled to a first control portion of an apparatus to be controlled, said first control means being operative when the first circuit means of the remote control unit is in its second operating state to control the first control portion of the apparatus in a predetermined manner;

second and third control means each coupled between the opposite ends of the first and second conductors and adapted to be coupled to a second control portion of the apparatus, said second control means being operative when the second circuit means of the remote control unit is in its second operating state to control the second control portion of the apparatus in a first predetermined manner, and said third control means being operative when the third circuit means of the remote control unit is in its second operating state to control the second control portion of the apparatus in a second predetermined manner; and fourth and fifth control means coupled between the opposite ends of the first and third conductors and adapted to be coupled to a third control portion of the apparatus, said fourth control means being operative when the fourth circuit means of the remote control unit is in its second operating state to control the third control portion of the apparatus in a first predetermined manner and said fifth control means being operative when the fifth circuit means of the remote control unit is in its second operating state to control the third control portion of the apparatus in a second predetermined manner.

2. A control circuit in accordance with claim 1 wherein the apparatus is a television receiver.

3. A control circuit in accordance with claim 2 wherein:

the television receiver is a color television receiver;

the first control portion includes a mechanism for turning the receiver on and off and for changing the channels of the receiver;

the second control portion includes a mechanism for increasing and decreasing the color level of the receiver; and the third control portion includes a mechanism for increasing and decreasing the tint level of the receiver.

4. A control circuit in accordance with claim 3 further comprising:

a fourth conductor; and speaker means coupled between the first ends of the first and fourth conductors;

and wherein:

the receiver further includes an audio output transformer means adapted to be coupled between the opposite ends of the first and fourth conductors, said audio output transformer means being operative to supply audio signals to the speaker means over the first and fourth conductors.

5. A control circuit in accordance with claim 1 wherein:

the first circuit means includes a switch movable between first and second positions;

the second circuit means includes a switch movable between first and second positions and a diode having anode and cathode electrodes, one of the electrodes being adapted to be placed in series with the switch when the switch is in its second position and the other electrode being coupled to the first end of the second conductor;

the third circuit means includes a switch movable between first and second positions and a diode having anode and cathode electrodes, one of the electrodes being adapted to be placed in series with the switch when the switch is in its second position and the other electrode being coupled to the first end of the second conductor;

the fourth circuit means includes a switch movable between first and second positions and a diode having anode and cathode electrodes, one of the electrodes being adapted to be placed in series with the switch when the switch is in its second position and the other electrode being coupled to the first end of the third conductor; and the fifth circuit means includes a switch movable between first and second positions and a diode having anode and cathode electrodes, one of the electrodes being adapted to be placed in series with the switch when the switch is in its second position and the other electrode being coupled to the first end of the third conductor.

6. A control circuit in accordance with claim 5 wherein:

the switches of the first, second, third, fourth and fifth circuit means are coupled in series when in their first positions.

7. A control circuit in accordance with claim 5 wherein:

the first control means includes:

a source of ac voltage operative to produce an ac voltage and having a first terminal coupled to the opposite end of the second conductor and a first terminal;

first and second relay circuit means each coupled to the opposite end of the second conductor and to the second terminal of the source of ac voltage; and a motor coupled to the first and second relay circuit means and adapted to be coupled to the first control portion of the apparatus;

said first and second relay circuit means being operative when the switch in the first circuit means is in its second position to receive an ac voltage produced by the source of ac voltage and, in response thereto, to cause the motor coupled thereto to operate the first control portion of the apparatus in a predetermined manner;

the second control means includes:

the aforesaid source of ac voltage;

the aforesaid first relay circuit means of the first control means; and a second motor coupled to the first relay circuit means and adapted to be coupled to the second control portion of the apparatus;

said first relay circuit means being operative when the switch in the second circuit means is in its second position to receive half cycles of one polarity of the ac voltage produced by the source of ac voltage and, in response thereto, to cause the second motor coupled thereto to operate the second control portion of the apparatus in a first predetermined manner;

the third control means includes:

the aforesaid source of ac voltage;

the aforesaid second relay circuit means of the first control means; and the aforesaid second motor, said second motor also being coupled to the second relay circuit means;

said second relay circuit means being operative when the switch in the third circuit means is in its second position to receive half cycles of the opposite polarity of the ac voltage produced by the source of ac voltage and, in response thereto, to cause the second motor coupled thereto to operate the second control portion of the apparatus in a second predetermined manner;

the fourth control means includes:

the aforesaid source of ac voltage;

relay circuit means coupled to the opposite end of the third conductor and to the second terminal of the source of ac voltage; and a third motor coupled to the relay circuit means and adapted to be coupled to the third control portion of the apparatus;

said relay circuit means being operative when the switch in the fourth circuit means is in its second position to receive half cycles of the said one polarity of the ac voltage produced by the source of ac voltage and, in response thereto, to cause the third motor coupled thereto to operate the third control portion of the apparatus in a first predetermined manner; and the fifth control means includes:

the aforesaid source of ac voltage;

relay circuit means coupled to the opposite end of the third conductor and to the second terminal of the source of ac voltage; and the aforesaid third motor, said third motor also being coupled to the relay circuit means;

said relay circuit means being operative when the switch in the fifth circuit means is in its second position to receive half cycles of the opposite polarity of the ac voltage produced by the source of ac voltage and, in response thereto, to cause the third motor coupled thereto to operate the third control portion of the apparatus in a second predetermined manner.

8. A control circuit in accordance with claim 7 wherein:

the first relay circuit means of the first control means comprises:

a relay assembly having a relay winding coupled at one end thereof to the opposite end of the second conductor;

a diode having anode and cathode electrodes, one of the electrodes being coupled to the other end of the relay winding of the relay assembly and the other electrode being connected to the second terminal of the source of ac voltage; and a capacitance connected in parallel with the relay winding of the relay assembly;

the second relay circuit of the first control means comprises:

a relay assembly having a relay winding coupled at one end thereof to the opposite end of the second conductor;

a diode having anode and cathode electrodes, one of the electrodes being coupled to the other end of the relay winding of the relay assembly and the other electrode being coupled to the second terminal of the source of ac voltage; and a capacitance connected in parallel with the relay winding of the relay assembly;

the relay circuit means of the second control means comprises:

the aforementioned relay assembly, diode, and capacitance of the first relay circuit means of the first control means;

the relay circuit means of the third control means comprises:

the aforementioned relay assembly, diode, and capacitance of the second relay circuit means of the first control means;

the relay circuit means of the fourth control means comprises:

a relay assembly having a relay winding coupled at one end thereof to the opposite end of the third conductor;

a diode having anode and cathode electrodes, one of the electrodes being coupled to the other end of the relay winding of the relay assembly and the other electrode being coupled to the second terminal of the source of ac voltage; and a capacitance connected in parallel with the relay winding of the relay assembly; and the relay circuit means of the fifth control means comprises:

a relay assembly having a relay winding coupled at one end thereof to the opposite end of the third conductor;

a diode having anode and cathode electrodes, one of the electrodes being coupled to the other end of the relay winding of the relay assembly and the other electrode being coupled to the second terminal of the source of ac voltage; and a capacitance connected in parallel with the relay winding of the relay assembly.

9. A control circuit in accordance with claim 8 wherein:

the diodes of the second and fourth circuit means and the diodes of the first relay circuit means of the first control means, the relay circuit means of the second control means, and of the relay circuit means of the fourth control means are poled in a first direction of current flow; and the diodes of the third and fifth circuit means and the diodes of the second relay circuit means of the first control means, the relay circuit means of the third control means, and of the relay circuit means of the fifth control means are poled in a second, opposite direction of current flow.

10. A control circuit in accordance with claim 9 wherein: the apparatus is a television receiver.

11. A control circuit in accordance with claim 10 wherein:

the television receiver is a color television receiver;

the first control portion includes a mechanism for turning the receiver on and off and for changing the channels of the receiver;

the second control portion includes a mechanism for increasing and decreasing the color level of the receiver; and the third control portion includes a mechanism for increasing and decreasing the tint level of the receiver.

12. A control circuit in accordance with claim 11 further comprising:

a fourth conductor; and speaker means coupled between the first ends of the first and fourth conductors;

and wherein:

the receiver further includes an audio output transformer means adapted to be coupled between the opposite ends of the first and fourth conductors, said audio output transformer means being operative to supply audio signals to the speaker means over the first and fourth conductors.

* * * * *